United States Patent
Banks, Jr. et al.

(10) Patent No.: US 11,827,283 B2
(45) Date of Patent: Nov. 28, 2023

(54) TAILGATE STOP APPARATUS

(71) Applicant: Banks Morrison Innovations LLC, Clayton, NC (US)

(72) Inventors: James E. Banks, Jr., Clayton, NC (US); Michael A. Morrison, Clayton, NC (US)

(73) Assignee: Banks Morrison Innovations LLC, Clayton, NC (US)

(*) Notice: Subject to any disclaimer, the term of this patent is extended or adjusted under 35 U.S.C. 154(b) by 428 days.

(21) Appl. No.: 17/067,227

(22) Filed: Oct. 9, 2020

(65) Prior Publication Data
US 2021/0107572 A1 Apr. 15, 2021

Related U.S. Application Data

(60) Provisional application No. 62/913,773, filed on Oct. 11, 2019.

(51) Int. Cl.
*B62D 33/027* (2006.01)
*E05D 11/10* (2006.01)

(52) U.S. Cl.
CPC ...... *B62D 33/0273* (2013.01); *E05D 11/1014* (2013.01)

(58) Field of Classification Search
CPC ..... B62D 33/037; B62D 33/0273; B60P 3/40; B60R 5/041; E05Y 2900/544; E05Y 2900/546; E05D 11/1014
USPC ...... 296/57.1, 51, 55, 26.08, 26.11
See application file for complete search history.

(56) References Cited

U.S. PATENT DOCUMENTS

| | | | |
|---|---|---|---|
| 4,884,838 A * | 12/1989 | Slater | B62D 35/007 |
| | | | 296/180.1 |
| 5,478,130 A * | 12/1995 | Matulin | B62D 33/0273 |
| | | | 296/57.1 |
| 5,741,039 A | 4/1998 | Habdas | |
| 5,788,311 A | 8/1998 | Tibbals | |
| 5,868,449 A | 2/1999 | Hitchcock | |
| 6,364,392 B1 * | 4/2002 | Meinke | B60P 3/40 |
| | | | 296/57.1 |
| 6,742,822 B2 | 6/2004 | Vejnar | |
| 6,805,392 B2 | 10/2004 | Leitner et al. | |

(Continued)

FOREIGN PATENT DOCUMENTS

DE 10121614 A1 11/2002

OTHER PUBLICATIONS

Martindell, Cameron, "The Future of Tailgates: GMC MultiPro Review," https://gearjunkie.com/gmc-multipro-tailgate-review, Jun. 5, 2019, 11 pages.

(Continued)

*Primary Examiner* — Jason S Morrow
*Assistant Examiner* — Wenwei Zhuo
(74) *Attorney, Agent, or Firm* — Dority & Manning, P.A.

(57) ABSTRACT

A tailgate stop apparatus. The apparatus includes a base member configured to be fixed with respect to a primary gate assembly of a multiple-gate tailgate. The apparatus includes a stop member coupled to the base member, wherein the stop member is movable between a tailgate-engaged position configured to inhibit an inner gate panel of an inner gate assembly of the multiple-gate tailgate from being moved to a closed position, and a tailgate-disengaged position configured to allow the inner gate panel to be moved to the closed position.

30 Claims, 8 Drawing Sheets

(56) References Cited

U.S. PATENT DOCUMENTS

| | | | |
|---|---|---|---|
| 6,890,013 | B2 | 5/2005 | Lacy |
| 7,204,537 | B1 | 4/2007 | Oh et al. |
| 7,267,387 | B1 | 9/2007 | Bruford et al. |
| 7,469,948 | B2 | 12/2008 | Karuppaswamy |
| 7,712,811 | B2 * | 5/2010 | Heaman ............. B62D 33/0273 296/62 |
| 8,201,869 | B1 * | 6/2012 | Butlin, Jr. ................ B60R 3/02 296/57.1 |
| 8,348,325 | B2 * | 1/2013 | Hausler ............. B62D 33/0273 296/62 |
| 8,398,140 | B2 | 3/2013 | Dinger et al. |
| 9,452,782 | B1 | 9/2016 | Singer |
| 9,463,746 | B2 | 10/2016 | Butlin, Jr. et al. |
| 9,981,700 | B1 * | 5/2018 | Garrison ............. B62D 33/037 |
| 10,005,396 | B2 | 6/2018 | Spahn et al. |
| 2002/0121794 | A1 * | 9/2002 | Vejnar ................ B62D 33/0273 296/26.11 |
| 2004/0227368 | A1 * | 11/2004 | Seksaria ................ B60P 3/40 296/57.1 |
| 2006/0045703 | A1 | 3/2006 | Dougherty |
| 2016/0075286 | A1 * | 3/2016 | Butlin, Jr. ............. B62D 33/03 296/50 |
| 2018/0346039 | A1 * | 12/2018 | Marchlewski ....... B62D 33/037 |
| 2019/0054961 | A1 * | 2/2019 | Ngo ......................... B60R 3/02 |
| 2022/0063736 | A1 * | 3/2022 | Williams ............... B62D 33/03 |

OTHER PUBLICATIONS

Author Unknown, "MultiPro Tailgate Problem/Issue Discovered—Lack of Engineering . . . ," https://www.gm-trucks.com/forums/topic/219692-multipro-tailgate-problemissue-discovered-lack-of-engineering/, Feb. 15, 2019, 7 pages.

* cited by examiner

TAILGATE STOP APPARATUS

RELATED APPLICATION

This application claims the benefit of U.S. Provisional Application No. 62/913,773, filed on Oct. 11, 2019, entitled "TAILGATE STOP APPARATUS," the disclosure of which is hereby incorporated herein by reference in its entirety.

BACKGROUND

The embodiments relate to a device that inhibits movement of an inner gate panel of a multiple-gate tailgate.

SUMMARY

In one embodiment an apparatus is provided. The apparatus includes a base member configured to be fixed with respect to a primary gate assembly of a multiple-gate tailgate. The apparatus further includes a stop member coupled to the base member, wherein the stop member is movable between a tailgate-engaged position configured to inhibit an inner gate panel of an inner gate assembly of the multiple-gate tailgate from being moved to a closed position, and a tailgate-disengaged position configured to allow the inner gate panel to be moved to the closed position.

In another embodiment a multiple-gate tailgate is provided. The multiple-gate tailgate includes a primary gate assembly, configured to be coupled to a vehicle, and an inner gate assembly that includes an inner gate panel positioned within the primary gate assembly. The inner gate panel is pivotable with respect to the primary gate assembly, and the inner gate panel has a closed position wherein the inner gate panel is co-planar with a primary gate panel of the primary gate assembly and a fully opened position wherein the inner gate panel is substantially perpendicular with respect to the primary gate panel. The multiple-gate tailgate includes a tailgate stop apparatus that includes a base member fixed to the primary gate assembly and a stop member coupled to the base member, wherein the stop member is movable between a tailgate-engaged position configured to inhibit the inner gate panel from being moved to a closed position, and a tailgate-disengaged position configured to allow the inner gate panel to be moved to the closed position.

In another embodiment a vehicle is provided. The vehicle includes a multiple-gate tailgate comprising a primary gate assembly and an inner gate assembly comprising an inner gate panel positioned within the primary gate assembly, the inner gate panel being pivotable with respect to the primary gate assembly, the inner gate panel having a closed position wherein the inner gate panel is co-planar with a primary gate panel of the primary gate assembly and a fully opened position wherein the inner gate panel is substantially perpendicular with respect to the primary gate panel. The vehicle includes a tailgate stop apparatus that includes a base member fixed to the primary gate assembly and a stop member coupled to the base member, wherein the stop member is movable between a tailgate-engaged position configured to inhibit the inner gate panel from being moved to a closed position, and a tailgate-disengaged position configured to allow the inner gate panel to be moved to the closed position.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Figure 1:
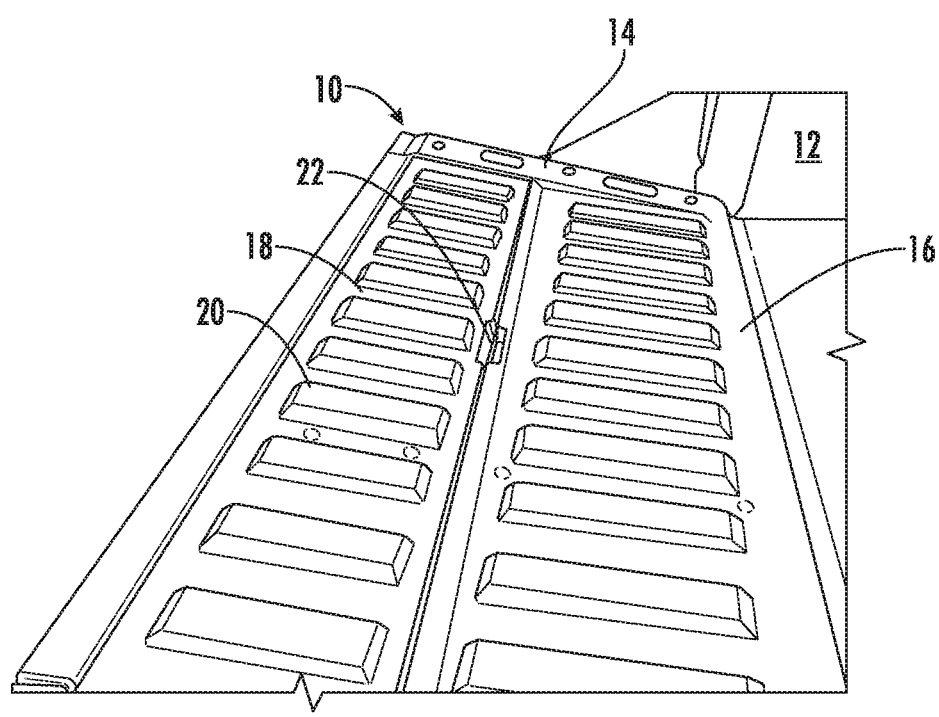
FIG. 1 is a view of a multiple-gate tailgate coupled to a vehicle, wherein an inner gate panel is in a closed position.

FIG. 1 is a view of a multiple-gate tailgate 10 coupled to a vehicle 12. The vehicle 12 may comprise any type of vehicle to which a tailgate can be coupled, such as a pickup truck or the like, including, by way of non-limiting example, GMC® Sierra® brand pickup trucks, Models 1500 and 2500. The multiple-gate tailgate 10 includes a primary gate assembly 14 that includes a primary gate panel 16, and an inner gate assembly 18 that includes an inner gate panel 20 and may include brackets and other sub-assemblies, such as connection members and the like. In FIG. 1, the inner gate panel 20 is in a closed position, and is co-planar with the primary gate panel 16. The primary gate panel 16 contains a recess into which the inner gate panel 20 pivots when being closed. The inner gate panel 20, in this embodiment, has a grasping area 22 that may grasped by the hand of a user to pivot or otherwise move the inner gate panel 20 to an open position.

Figure 2:
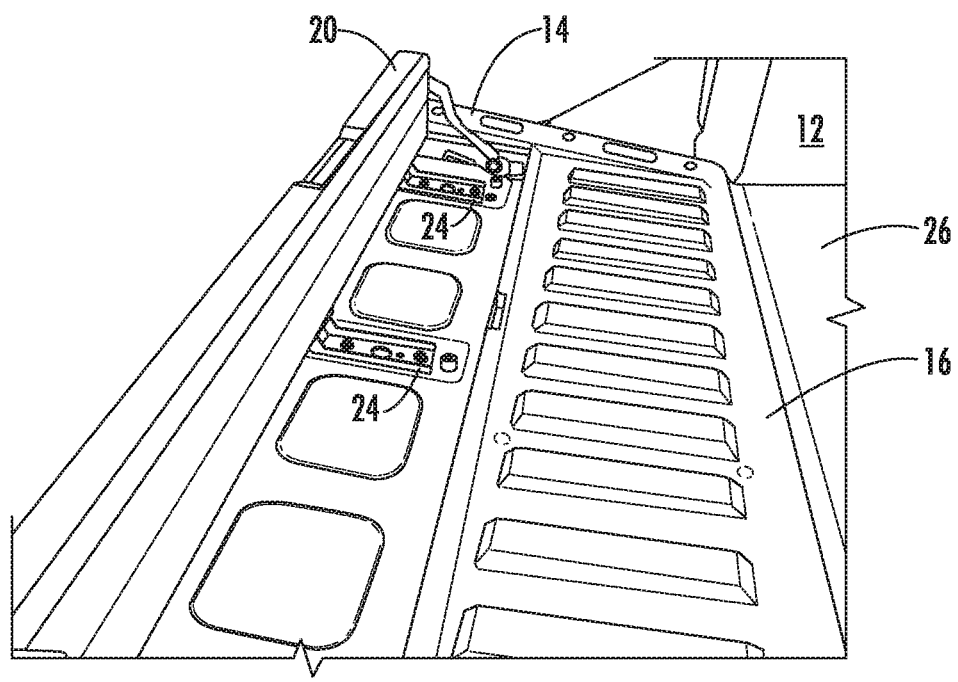
FIG. 2 is a view of the multiple-gate tailgate illustrated in FIG. 1 with the inner gate panel in an open position.

FIG. 2 is a view of the multiple-gate tailgate 10 and the vehicle 12 with the inner gate panel 20 in an open position. In the open position, the inner gate panel 20 is typically substantially (i.e., within +/−10%) perpendicular to the primary gate panel 16, although what constitutes the open position may differ among different vehicle models. The inner gate assembly 18 may include one or more brackets 24 that couple the inner gate panel 20 to the primary gate assembly 14, and which allows the inner gate panel 20 to move with respect to the primary gate panel 16 from the closed position to the open position, and vice versa.

The inner gate panel 20 may be moved to the open position, as illustrated in FIG. 2, to prevent items that are located in a bed 26 of the vehicle 12 from sliding from the bed, to the multiple-gate tailgate 10, and exiting the multiple-gate tailgate 10 onto the road, particularly during acceleration of the vehicle 12. However, upon an abrupt stop of the vehicle 12, the inner gate panel 20 may undesirably pivot or otherwise move from the open position to the closed position (FIG. 1). Subsequent acceleration of the vehicle 12 may then cause items in the bed 26 to slide from the bed, to the multiple-gate tailgate 10, and off the multiple-gate tailgate 10 onto the road because the inner gate panel 20 is no longer in the open position.

Figure 3:
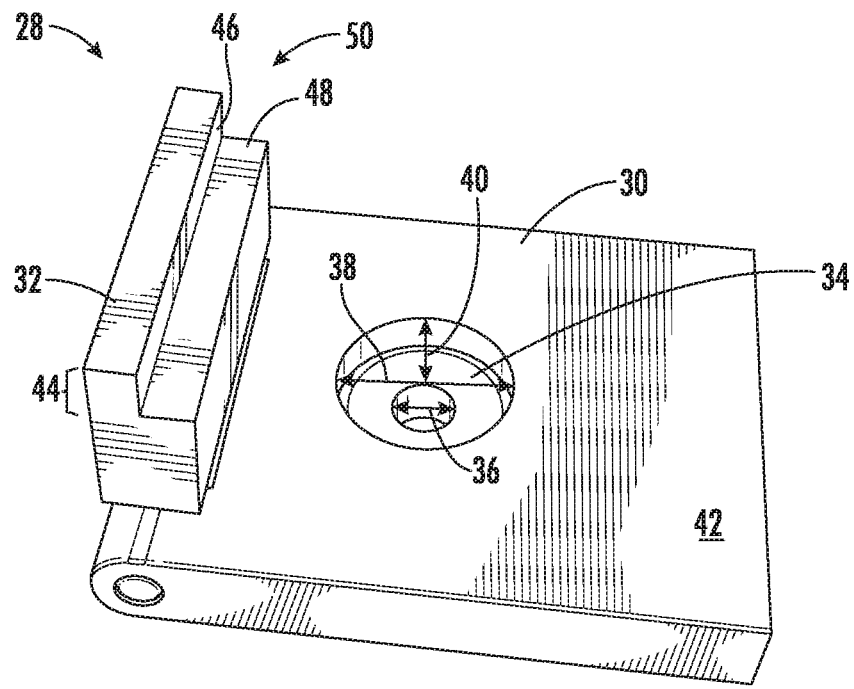
FIG. 3 is a top perspective view of a tailgate stop apparatus according to one embodiment.

FIG. 3 is a top perspective view of an apparatus 28 (sometimes referred to as a tailgate stop apparatus) according to one embodiment. The apparatus 28 includes a base member 30 that is movably coupled to a stop member 32. The base member 30 is, in this embodiment, substantially planar, and forms an opening 34. The opening 34 in this embodiment has a stepped profile, with a first smaller diameter 36 configured to receive the threaded shaft of a bolt, and a second larger diameter 38 configured to receive the head of the bolt. The second larger diameter 38 preferably has a depth 40 sufficient such that the head of the bolt is coplanar with or below a surface 42 of the base member 30.

The stop member 32 is movable between a tailgate-engaged position, as illustrated in FIG. 3, and a tailgate-disengaged position. When in the tailgate-engaged position, the stop member 32 inhibits the inner gate panel 20 (FIG. 2) from being moved to the closed position. The stop member 32, in the tailgate-engaged position, is substantially perpendicular to the base member 30. The stop member 32 has a distal end portion 44 that includes a side surface 46 and a bottom surface 48 that form a rabbet profile 50.

Figure 4:
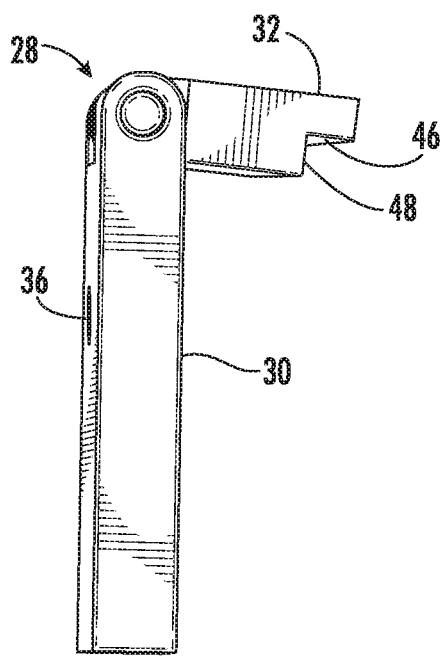
FIG. 4 is a side perspective view of the tailgate stop apparatus according to one embodiment.

FIG. 4 is a side perspective view of the apparatus 28 according to one embodiment.

Figure 5:
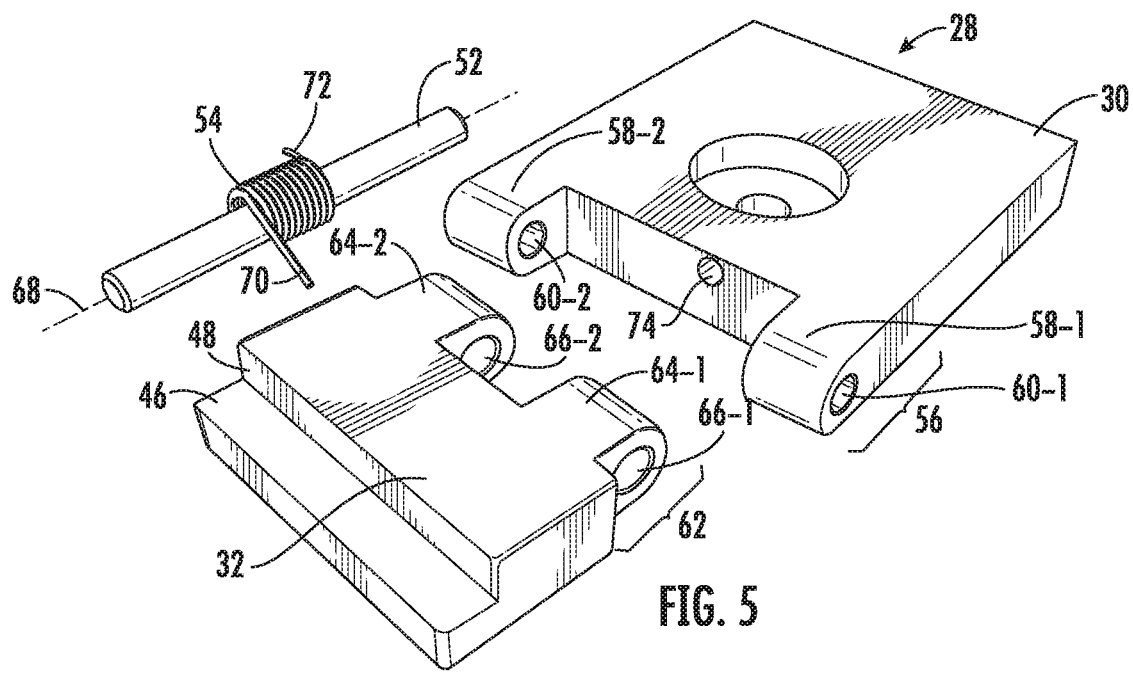
FIG. 5 is a perspective view of the tailgate stop apparatus in a dis-assembled state according to one embodiment.

FIG. 5 is a perspective view of the apparatus 28 in a dis-assembled state according to one embodiment. The apparatus 28 includes a pin 52 and an elastic member 54. In this embodiment, the elastic member 54 comprises a torsion spring, but any suitable mechanism which can apply torque to the stop member 32 to thereby urge the stop member 32 toward the tailgate-engaged position may be used.

The base member 30 includes a first end portion 56 that includes two base member extensions 58-1-58-2. Each base member extension 58-1, 58-2 forms a corresponding opening 60-1, 60-2 that are co-linear, and that are sized to receive the pin 52. In some embodiments, the openings 60-1, 60-2 have a diameter only slightly larger than a diameter of the pin 52 such that once urged into the openings 60-1, 60-2, the pin 52 remains in a same position with respect to the openings 60-1, 60-2.

The stop member 32 comprises a connection end portion 62 that includes two stop member extensions 64-1, 64-2, each stop member extension 64-1, 64-2 forming a corresponding opening 66-1, 66-2 that are co-linear, and that are sized to receive the pin 52. In some embodiments, the openings 66-1, 66-2 have a diameter only slightly larger than a diameter of the pin 52 such that once urged into the openings 66-1, 66-2, the pin 52 remains in a same position with respect to the openings 66-1, 66-2.

The elastic member 54 comprises a longitudinal axis 68, a first arm 70 and a second arm 72. The first end portion 56 of the base member 30 forms an opening 74. When assembled, the first arm 70 is positioned at least partially within the opening 74 to inhibit movement of the first arm 70 when the second arm 72 is rotated about the longitudinal axis 68 to maintain a force upon the stop member 32.

To assemble the apparatus 28, the stop member 32 is oriented such that the openings 66-1, 66-2 are collinear with the openings 60-1, 60-2. The first arm 70 of the elastic member 54 is inserted into the opening 74 and the second arm 72 positioned against the underside of the stop member 32. The elastic member 54 is oriented such that the longitudinal axis 68 is collinear with the openings 66-1, 66-2 and the openings 60-1, 60-2. The pin 52 is introduced into either the opening 60-1 or 60-2 and urged through the openings 66-1, 66-2 and the elastic member 54 until the pin 52 is substantially flush at both ends with surfaces of the base member 30.

Figure 6:
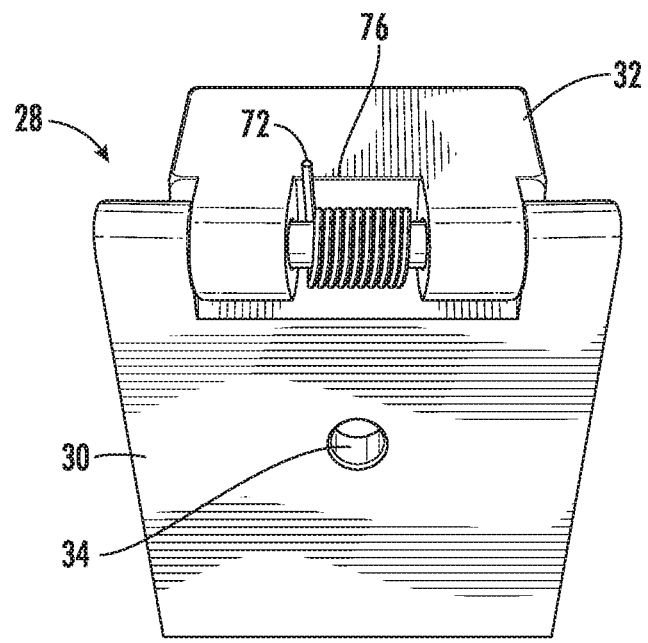
FIG. 6 is a rear perspective view of the tailgate stop apparatus according to one embodiment.

FIG. 6 is a rear perspective view of the apparatus 28 according to one embodiment. The openings 66-1, 66-2 are colinear with the openings 60-1, 60-2; the elastic member 54 is positioned about the pin 52; and the pin 52 is positioned within each of the openings 66-1, 66-2 and the openings 60-1, 60-2. The second arm 72 is positioned to abut a surface 76 of the stop member 32 such that the elastic member 54 is configured to urge the stop member 32 into the tailgate-engaged position.

Figure 7:
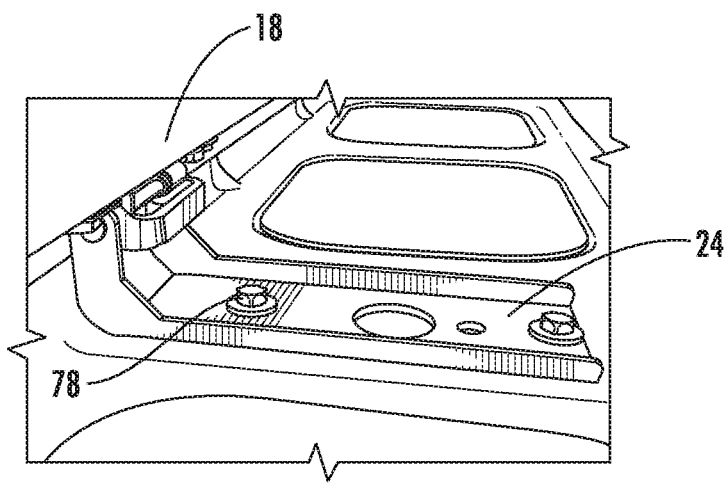
FIG. 7 is a perspective view of a bracket of an inner gate assembly.

FIG. 7 is a perspective view of a bracket 24 of the inner gate assembly 18. The bracket 24 fixes the inner gate panel 20 with respect to the primary gate assembly 14, and allows the inner gate panel 20 to pivot from the open position to the closed position. The bracket 24 is fixed to the primary gate assembly 14 via a bolt 78.

Figure 8:
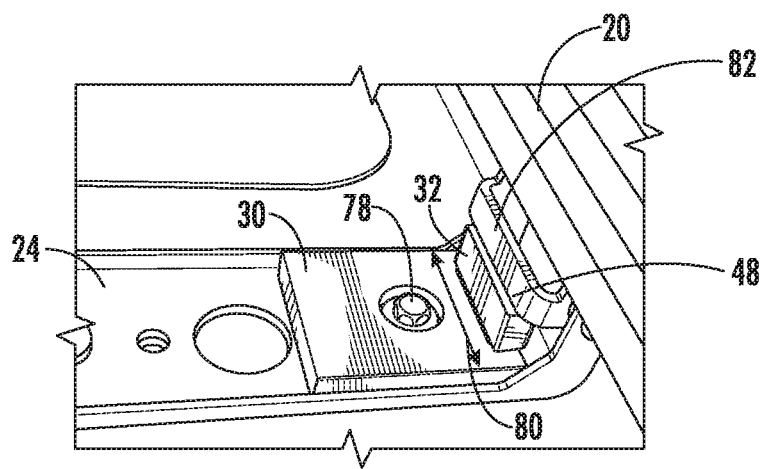
FIG. 8 is a perspective view of the bracket illustrated in FIG. 7 with the tailgate stop apparatus installed.

FIG. 8 is a perspective view of the bracket 24 of the inner gate assembly 18 with the apparatus 28 installed. The apparatus 28 is in the tailgate-engaged position, and is fixed with respect to the primary gate assembly 14 via the bolt 78. The bolt 78 is positioned within the opening 34 of the base member 30. The base member 30 has a width 80 sized to fit within a recess of the bracket 24. Although the opening 34 and bolt 78 illustrate one mechanism for fixing the base member 30 with respect to the primary gate assembly 14, any suitable attachment mechanism may be used, such as welding, adhesives, a friction fit with a suitable structure, or the like.

The inner gate assembly 18 includes a bracket 82 that is fixed with respect to the inner gate panel 20. The bottom surface 48 is configured to inhibit movement of the inner gate assembly 18 when in the tailgate-engaged position by inhibiting movement of the bracket 82 as the inner gate panel 20 moves to a closed position. Thus, if the vehicle 12 abruptly stops, the bracket 82 is inhibited from forward movement by the bottom surface 48, and the inner gate panel 20 remains in an open position. If subsequent acceleration of the vehicle 12 causes items in the bed 26 to slide toward the rear of the vehicle 12, the items will contact the inner gate panel 20 and be stopped from exiting the vehicle 12.

Figure 9:
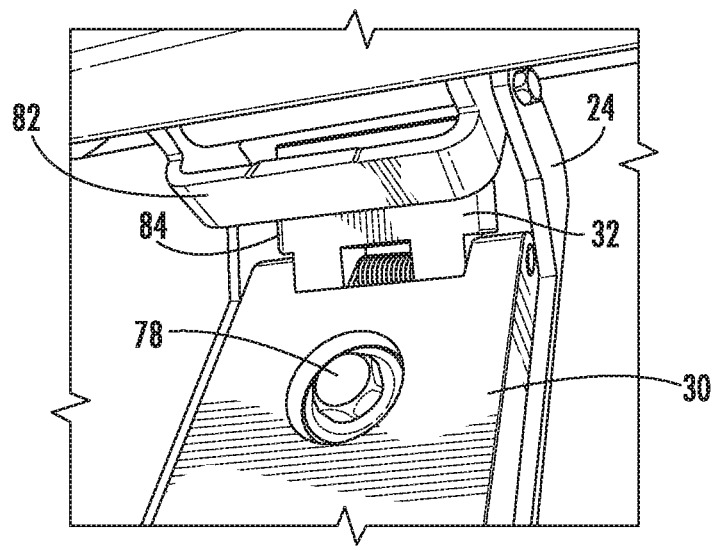
FIG. 9 is a perspective view of the bracket of the inner gate assembly with the tailgate stop apparatus installed, wherein the stop member has been urged from the tailgate-engaged position to a tailgate-disengaged position.

FIG. 9 is a perspective view of the bracket 24 of the inner gate assembly 18 with the apparatus 28 installed, wherein the stop member 32 has been urged out of the tailgate-engaged position to a tailgate-disengaged position. This may be accomplished, for example, by an operator pressing a finger of one hand against a surface 84 to urge the stop member 32 backwards such that the bottom surface 48 is no longer in contact with the bracket 82. The operator can then, while urging the stop member 32 backwards, begin to move the inner gate panel 20 toward the closed position. As the inner gate panel 20 moves to the closed position, the bracket 82 contacts a surface of the stop member 32 and has sufficient force to overcome forces imparted by the elastic member 54, and forces the stop member 32 into a fold-down position wherein the surface 84 of the stop member 32 is substantially coplanar with the surface 42 of the base member 30 when the inner gate panel 20 is in the closed position.

Figure 10A:
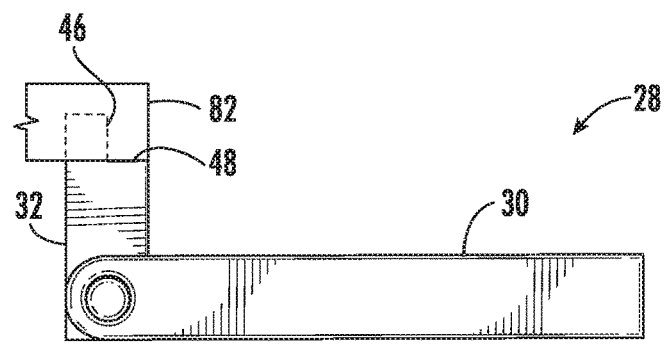
FIGS. 10A-10D are schematic diagrams illustrating the tailgate stop apparatus at different points in time according to one embodiment.

FIGS. 10A-10D are schematic diagrams illustrating the apparatus 28 at different points in time according to one embodiment. Referring first to FIG. 10A, the inner gate panel 20 is in a fully opened position, and the apparatus 28 is in the tailgate-engaged position. The bracket 82 of the inner gate assembly 18 is inhibited from movement by the bottom surface 48, and thus the inner gate panel 20 cannot be closed. The side surface 46 abuts the bracket 82 due to the torque applied to the stop member 32 by the elastic member 54 (e.g., in this embodiment, a torsion spring).

Figure 10B:
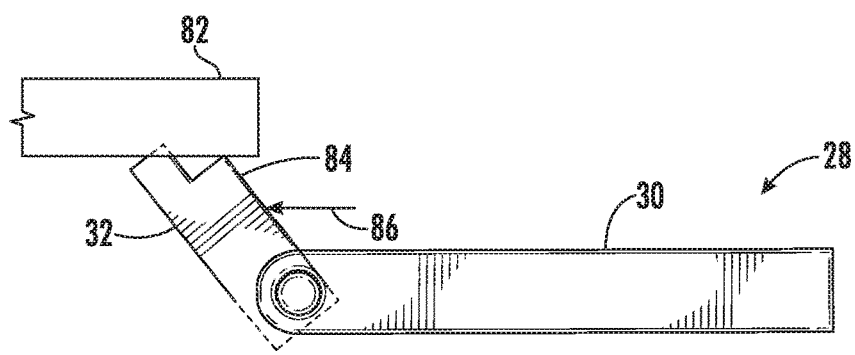
Figure 10C:
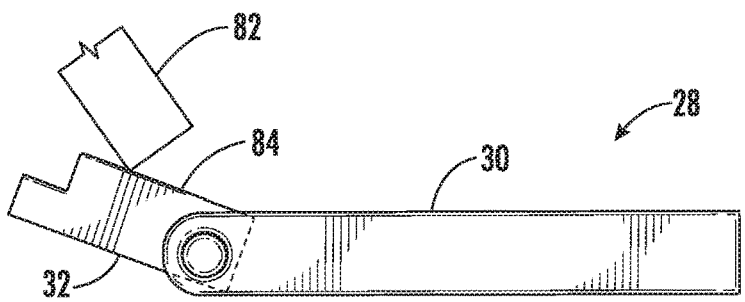

Referring now to FIG. 10B an operator has applied a force 86 to the surface 84 to urge the stop member 32 backwards such that the bottom surface 48 is no longer in contact with the bracket 82. The force may be applied by either a finger or an object. Referring now to FIG. 10C, the operator has begun closing the inner gate assembly 18 by, for example, using a second hand to grasp the inner gate panel 20 and begin to pivot or otherwise move the inner gate panel 20 toward the recess in the primary gate panel 16.

Referring now to FIG. 10C, at the point that the bottom surface 48 is no longer capable of inhibiting the movement of the bracket 82, the stop member 32 is in the tailgate-disengaged position. The tailgate-disengaged position is any position of the stop member 32 in which the stop member 32 is not capable of inhibiting the movement of the inner gate panel 20 in the direction of closure. The bracket 82 contacts the surface 84 of the stop member 32. Although the elastic member 54 urges the stop member 32 into a tailgate-engaged position, the weight of the inner gate assembly 18 urges the surface 84 downward as the inner gate panel 20 is closed.

Figure 10D:
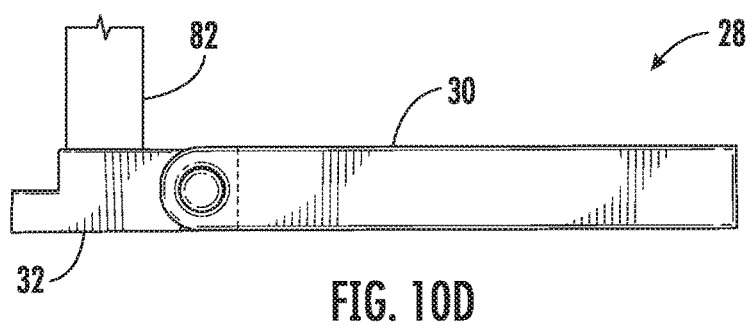

Referring now to FIG. 10D, the inner gate panel 20 is in the closed position and positioned within the recess of the primary gate panel 16. The bracket 82 rests on top of the stop member 32 and urges the stop member 32 into a position such that the surface 84 is substantially co-planar with the top surface of the base member 30.

To return the inner gate panel 20 to the open position, the operator need simply grasp the grasping area 22 (FIG. 1) and lift/pivot the inner gate panel 20 to a substantially perpendicular position with respect to the primary gate panel 16. As the bracket 82 raises along with the inner gate panel 20, the stop member 32 is urged against the bracket 82 by the elastic member 54, as illustrated in FIG. 10C. When the bracket 82 reaches the position illustrated in FIG. 10A, the bottom surface 48 of the stop member 32 slides under the bracket 82, inhibiting closure of the inner gate panel 20, inadvertent or otherwise, until a force is applied to the source to disengage the bottom surface 48 from the bracket 82.

Figure 11A:
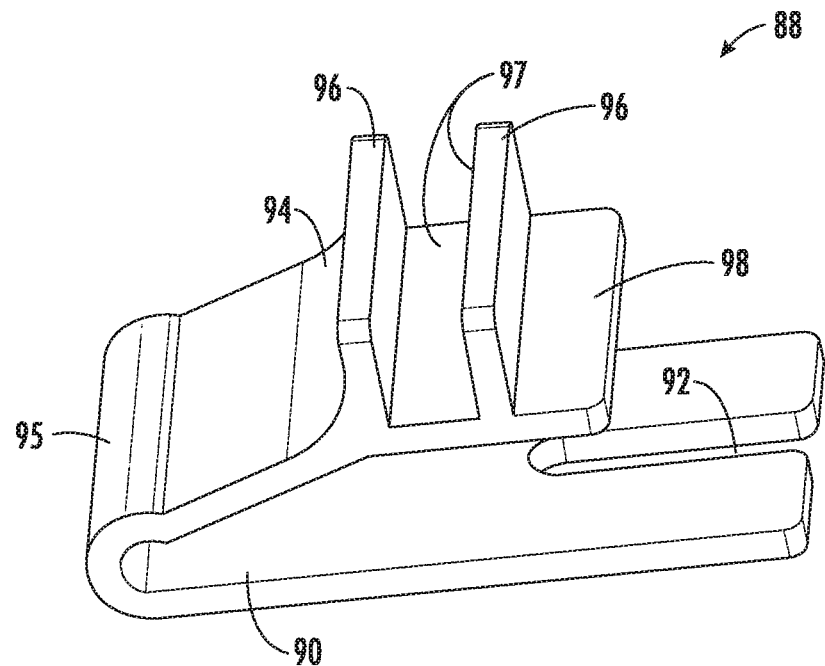
FIGS. 11A-11B illustrate a tailgate stop apparatus according to another embodiment.

FIG. 11A is a perspective view of an apparatus 88 according to another embodiment. The apparatus 88 has a base member 90 forming an opening 92, which in this embodiment, is a through-slot. The base member 90 is configured to be fixed with respect to the primary gate assembly 14 of the multiple-gate tailgate 10. For example, the bolt 78 (FIG. 9) may secure the base member 90 with respect to the primary gate assembly 14 via the opening 92. A stop member 94 is coupled to the base member 90 via an elastic member 95. The elastic member 95 urges the stop member 94 into the tailgate-engaged position. In this embodiment, the stop member 94 includes two extensions 96. In other embodiments, the stop member 94 may have one extension 96, or may have no extensions 96, and have a completely planar surface that inhibits forward movement of the bracket 82. The stop member 94 is movable between a tailgate-engaged position configured to inhibit the inner gate panel 20 of the inner gate assembly 18 of the multiple-gate tailgate 10 from being moved to the closed position. The stop member 94 has a tailgate-disengaged position configured to allow the inner gate panel 20 to be moved to the closed position. In FIG. 11A, the stop member 94 is in the tailgate-engaged position, and the bracket 82 is inhibited from forward movement (i.e., toward a closed position of the inner gate panel 20) via either one or both of surfaces 97. The operator may urge the stop member 94 toward the base member 90, such as by pressing on a surface 98, to put the stop member 94 in the tailgate-disengaged position and allow the bracket 82 to move in the forward direction, and thereby allow the inner gate panel 20 to be closed.

Figure 11B:
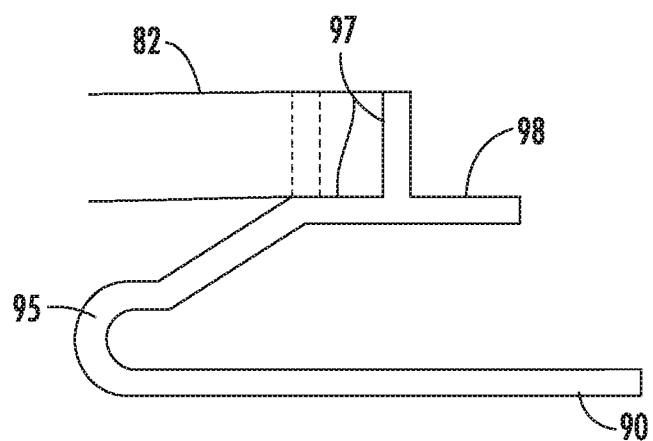

FIG. 11B is a diagram illustrating the inner gate panel 20 in an open position, with the bracket 82 being inhibited from movement via one or both of the surfaces 97.

Those skilled in the art will recognize improvements and modifications to the preferred embodiments of the disclosure. All such improvements and modifications are considered within the scope of the concepts disclosed herein and the claims that follow.

What is claimed is:

1. An apparatus comprising:
   a base member configured to be fixed with respect to a primary gate assembly of a multiple-gate tailgate; and
   a stop member rotatably connected to the base member, wherein the stop member is movable between a tailgate-engaged position configured to inhibit an inner gate panel of an inner gate assembly of the multiple-gate tailgate from being moved to a closed position, and a tailgate-disengaged position configured to allow the inner gate panel to be moved to the closed position, wherein the stop member is rotatable about an axis that extends through the stop member and the base member.

2. The apparatus of claim 1 wherein to move between the tailgate-engaged position and the tailgate-disengaged position, the stop member is configured to be pivoted from the tailgate-engaged position to the tailgate-disengaged position.

3. The apparatus of claim 2 wherein the stop member is configured to be pivoted to a position wherein the stop member is co-planar with the base member.

4. The apparatus of claim 2 wherein the stop member is configured to be pivoted to a position wherein the stop member is perpendicular with respect to the base member.

5. The apparatus of claim 2 further comprising an elastic member that is configured to urge the stop member from the tailgate-disengaged position into the tailgate-engaged position.

6. The apparatus of claim 5 wherein the elastic member comprises a torsion spring, the torsion spring configured to urge the stop member into the tailgate-engaged position.

7. The apparatus of claim 6 further comprising a pin, and wherein the base member comprises:
a first end portion comprising two base member extensions, each base member extension forming a corresponding opening configured to receive the pin; and
wherein
the stop member comprises a connection end portion comprising two stop member extensions, each stop member extension forming a corresponding opening configured to receive the pin; and
wherein:
the corresponding openings in the connection end portions are co-linear with the corresponding openings in the two base member extensions;
the torsion spring is positioned about the pin; and
the pin is positioned within each of the corresponding openings in the connection end portions and the corresponding openings in the two base member extensions.

8. The apparatus of claim 7 wherein the torsion spring comprises a longitudinal axis, a first arm, and a second arm, and wherein the first end portion of the base member forms an opening, and wherein the first arm is positioned at least partially within the opening to inhibit movement of the first arm when the second arm is rotated about the longitudinal axis.

9. The apparatus of claim 8 wherein the second arm is positioned to abut a surface of the stop member such that the torsion spring is configured to urge the stop member into the tailgate-engaged position.

10. The apparatus of claim 1 wherein the stop member comprises:
a distal end portion comprising:
a side surface and a bottom surface that collectively form a rabbet profile; and
wherein when the stop member is in the tailgate-engaged position, the bottom surface is configured to inhibit movement of the inner gate assembly and the side surface is configured to abut the inner gate assembly.

11. The apparatus of claim 10 wherein the bottom surface is configured to inhibit movement of a surface of a bracket of the inner gate assembly, wherein the stop member comprises a planar surface that is configured to contact the bracket when the stop member is in the tailgate-disengaged position, and pivot to a fold-down position in response to contact with the bracket when the inner gate panel is moved to a closed position.

12. A multiple-gate tailgate comprising:
a primary gate assembly configured to be coupled to a vehicle;
an inner gate assembly comprising an inner gate panel positioned within the primary gate assembly, the inner gate panel being pivotable with respect to the primary gate assembly, the inner gate panel having a closed position wherein the inner gate panel is co-planar with a primary gate panel of the primary gate assembly and a fully opened position wherein the inner gate panel is substantially perpendicular with respect to the primary gate panel; and
an apparatus comprising:
a base member fixed to the primary gate assembly; and
a stop member rotatably connected to the base member, wherein the stop member is movable between a tailgate-engaged position configured to inhibit the inner gate panel from being moved to the closed position, and a tailgate-disengaged position configured to allow the inner gate panel to be moved to the closed position, wherein the stop member is rotatable about an axis that extends through the stop member and the base member.

13. The multiple-gate tailgate of claim 12 wherein to move between the tailgate-engaged position and the tailgate-disengaged position, the stop member is configured to be pivoted from the tailgate-engaged position to the tailgate-disengaged position.

14. The multiple-gate tailgate of claim 12 further comprising an elastic member that is configured to urge the stop member from the tailgate-disengaged position into the tailgate-engaged position.

15. A vehicle comprising:
a multiple-gate tailgate comprising:
a primary gate assembly;
an inner gate assembly comprising an inner gate panel positioned within the primary gate assembly, the inner gate panel being pivotable with respect to the primary gate assembly, the inner gate panel having a closed position wherein the inner gate panel is co-planar with a primary gate panel of the primary gate assembly and a fully opened position wherein the inner gate panel is substantially perpendicular with respect to the primary gate panel; and
an apparatus comprising:
a base member fixed to the primary gate assembly; and
a stop member rotatably connected to the base member, wherein the stop member is movable between a tailgate-engaged position configured to inhibit the inner gate panel from being moved to the closed position, and a tailgate-disengaged position configured to allow the inner gate panel to be moved to the closed position, wherein the stop member is rotatable about an axis that extends through the stop member and the base member.

16. The vehicle of claim 15 wherein to move between the tailgate-engaged position and the tailgate-disengaged position, the stop member is configured to be pivoted from the tailgate-engaged position to the tailgate-disengaged position.

17. The vehicle of claim 15 further comprising an elastic member that is configured to urge the stop member from the tailgate-disengaged position into the tailgate-engaged position.

18. An apparatus comprising:
a base member configured to be fixed with respect to a primary gate assembly of a multiple-gate tailgate;
a stop member pivotally coupled to the base member, wherein the stop member is configured to be pivoted between a tailgate-engaged position configured to inhibit an inner gate panel of an inner gate assembly of the multiple-gate tailgate from being moved to a closed position, and a tailgate-disengaged position configured to allow the inner gate panel to be moved to the closed position; and
a torsion spring, the torsion spring configured to urge the stop member into the tailgate-engaged position.

19. An apparatus comprising:
a base member configured to be fixed with respect to a primary gate assembly of a multiple-gate tailgate; and
a stop member coupled to the base member, wherein the stop member is movable between a tailgate-engaged position configured to inhibit an inner gate panel of an inner gate assembly of the multiple-gate tailgate from being moved to a closed position, and a tailgate-disengaged position configured to allow the inner gate panel to be moved to the closed position;
wherein the stop member comprises:
a distal end portion comprising:
a side surface and a bottom surface that collectively form a rabbet profile; and
wherein, when the stop member is in the tailgate-engaged position, the bottom surface is configured to inhibit movement of the inner gate assembly and the side surface is configured to abut the inner gate assembly.

20. The apparatus of claim 1 wherein the stop member is coupled to the base member via a pin that extends through openings in the base member and the stop member.

21. The apparatus of claim 1 wherein the base member comprises a through-hole configured to align with a threaded receiver of the multiple-gate tailgate to facilitate connection of the base member to the multiple-gate tailgate via a bolt.

22. An apparatus comprising:
a base member configured to be fixed with respect to a primary gate assembly of a multiple-gate tailgate; and
a stop member rotatably connected to the base member, wherein the stop member is movable between a tailgate-engaged position configured to inhibit an inner gate panel of an inner gate assembly of the multiple-gate tailgate from being moved to a closed position, and a tailgate-disengaged position configured to allow the inner gate panel to be moved to the closed position,
wherein the stop member is coupled to the base member via a pin that extends through openings in the base member and the stop member.

23. An apparatus comprising:
a base member configured to be fixed with respect to a primary gate assembly of a multiple-gate tailgate;
a stop member rotatably connected to the base member, wherein the stop member is movable between a tailgate-engaged position configured to inhibit an inner gate panel of an inner gate assembly of the multiple-gate tailgate from being moved to a closed position, and a tailgate-disengaged position configured to allow the inner gate panel to be moved to the closed position, wherein to move between the tailgate-engaged position and the tailgate-disengaged position, the stop member is configured to be pivoted from the tailgate-engaged position to the tailgate-disengaged position; and
an elastic member comprising a torsion spring that is configured to urge the stop member from the tailgate-disengaged position into the tailgate-engaged position.

24. An apparatus comprising:
a base member configured to be fixed with respect to a primary gate assembly of a multiple-gate tailgate; and
a stop member rotatably connected to the base member, wherein the stop member is movable between a tailgate-engaged position configured to inhibit an inner gate panel of an inner gate assembly of the multiple-gate tailgate from being moved to a closed position, and a tailgate-disengaged position configured to allow the inner gate panel to be moved to the closed position,
wherein the stop member comprises:
a distal end portion comprising:
a side surface and a bottom surface that collectively form a rabbet profile; and
wherein, when the stop member is in the tailgate-engaged position, the bottom surface is configured to inhibit movement of the inner gate assembly and the side surface is configured to abut the inner gate assembly.

25. A multiple-gate tailgate comprising:
a primary gate assembly configured to be coupled to a vehicle;
an inner gate assembly comprising an inner gate panel positioned within the primary gate assembly, the inner gate panel being pivotable with respect to the primary gate assembly, the inner gate panel having a closed position wherein the inner gate panel is co-planar with a primary gate panel of the primary gate assembly and a fully opened position wherein the inner gate panel is substantially perpendicular with respect to the primary gate panel; and
an apparatus comprising:
a base member fixed to the primary gate assembly; and
a stop member rotatably connected to the base member, wherein the stop member is movable between a tailgate-engaged position configured to inhibit the inner gate panel from being moved to the closed position, and a tailgate-disengaged position configured to allow the inner gate panel to be moved to the closed position, wherein the stop member is coupled to the base member via a pin that extends through openings in the base member and the stop member.

26. A multiple-gate tailgate comprising:
a primary gate assembly configured to be coupled to a vehicle;
an inner gate assembly comprising an inner gate panel positioned within the primary gate assembly, the inner gate panel being pivotable with respect to the primary gate assembly, the inner gate panel having a closed position wherein the inner gate panel is co-planar with a primary gate panel of the primary gate assembly and a fully opened position wherein the inner gate panel is substantially perpendicular with respect to the primary gate panel; and
an apparatus comprising:
a base member fixed to the primary gate assembly;
a stop member rotatably connected to the base member, wherein the stop member is movable between a tailgate-engaged position configured to inhibit the inner gate panel from being moved to the closed position, and a tailgate-disengaged position configured to allow the inner gate panel to be moved to the closed position, wherein to move between the tailgate-engaged position and the tailgate-disengaged position, the stop member is configured to be pivoted from the tailgate-engaged position to the tailgate-disengaged position; and
an elastic member comprising a torsion spring that is configured to urge the stop member from the tailgate-disengaged position into the tailgate-engaged position.

27. A multiple-gate tailgate comprising:
a primary gate assembly configured to be coupled to a vehicle;
an inner gate assembly comprising an inner gate panel positioned within the primary gate assembly, the inner gate panel being pivotable with respect to the primary gate assembly, the inner gate panel having a closed position wherein the inner gate panel is co-planar with a primary gate panel of the primary gate assembly and a fully opened position wherein the inner gate panel is substantially perpendicular with respect to the primary gate panel; and an apparatus comprising:
- a base member fixed to the primary gate assembly; and
- a stop member rotatably connected to the base member, wherein the stop member is movable between a tailgate-engaged position configured to inhibit the inner gate panel from being moved to the closed position, and a tailgate-disengaged position configured to allow the inner gate panel to be moved to the closed position, wherein the stop member comprises:
  - a distal end portion comprising:
    - a side surface and a bottom surface that collectively form a rabbet profile; and
    - wherein, when the stop member is in the tailgate-engaged position, the bottom surface is configured to inhibit movement of the inner gate assembly and the side surface is configured to abut the inner gate assembly.

28. A vehicle comprising:

a multiple-gate tailgate comprising:
- a primary gate assembly;
- an inner gate assembly comprising an inner gate panel positioned within the primary gate assembly, the inner gate panel being pivotable with respect to the primary gate assembly, the inner gate panel having a closed position wherein the inner gate panel is co-planar with a primary gate panel of the primary gate assembly and a fully opened position wherein the inner gate panel is substantially perpendicular with respect to the primary gate panel; and
- an apparatus comprising:
  - a base member fixed to the primary gate assembly; and
  - a stop member rotatably connected to the base member, wherein the stop member is movable between a tailgate-engaged position configured to inhibit the inner gate panel from being moved to the closed position, and a tailgate-disengaged position configured to allow the inner gate panel to be moved to the closed position, wherein the stop member is coupled to the base member via a pin that extends through openings in the base member and the stop member.

29. A vehicle comprising:

a multiple-gate tailgate comprising:
- a primary gate assembly;
- an inner gate assembly comprising an inner gate panel positioned within the primary gate assembly, the inner gate panel being pivotable with respect to the primary gate assembly, the inner gate panel having a closed position wherein the inner gate panel is co-planar with a primary gate panel of the primary gate assembly and a fully opened position wherein the inner gate panel is substantially perpendicular with respect to the primary gate panel; and
- an apparatus comprising:
  - a base member fixed to the primary gate assembly;
  - a stop member rotatably connected to the base member, wherein the stop member is movable between a tailgate-engaged position configured to inhibit the inner gate panel from being moved to the closed position, and a tailgate-disengaged position configured to allow the inner gate panel to be moved to the closed position, wherein to move between the tailgate-engaged position and the tailgate-disengaged position, the stop member is configured to be pivoted from the tailgate-engaged position to the tailgate-disengaged position; and
  - an elastic member comprising a torsion spring that is configured to urge the stop member from the tailgate-disengaged position into the tailgate-engaged position.

30. A vehicle comprising:

a multiple-gate tailgate comprising:
- a primary gate assembly;
- an inner gate assembly comprising an inner gate panel positioned within the primary gate assembly, the inner gate panel being pivotable with respect to the primary gate assembly, the inner gate panel having a closed position wherein the inner gate panel is co-planar with a primary gate panel of the primary gate assembly and a fully opened position wherein the inner gate panel is substantially perpendicular with respect to the primary gate panel; and
- an apparatus comprising:
  - a base member fixed to the primary gate assembly; and
  - a stop member rotatably connected to the base member, wherein the stop member is movable between a tailgate-engaged position configured to inhibit the inner gate panel from being moved to the closed position, and a tailgate-disengaged position configured to allow the inner gate panel to be moved to the closed position,
  - wherein the stop member comprises:
    - a distal end portion comprising:
      - a side surface and a bottom surface that collectively form a rabbet profile; and
      - wherein, when the stop member is in the tailgate-engaged position, the bottom surface is configured to inhibit movement of the inner gate assembly and the side surface is configured to abut the inner gate assembly.

* * * * *